Feb. 12, 1924.

D. BRANDRIFF 1,483,569

LUBRICATING ATTACHMENT FOR PERCUSSION TOOLS

Filed July 21, 1920

Inventor
Daniel Brandriff
By Henry E. Rockwell
Attorney

Patented Feb. 12, 1924.

1,483,569

UNITED STATES PATENT OFFICE.

DANIEL BRANDRIFF, OF SHORT BEACH, CONNECTICUT, ASSIGNOR TO MALLEABLE IRON FITTINGS COMPANY, OF BRANFORD, CONNECTICUT.

LUBRICATING ATTACHMENT FOR PERCUSSION TOOLS.

Application filed July 21, 1920. Serial No. 397,962.

*To all whom it may concern:*

Be it known that I, DANIEL BRANDRIFF, a citizen of the United States, residing at Short Beach, town of Branford, county of New Haven, State of Connecticut, have invented certain new and useful Improvements in Lubricating Attachments for Percussion Tools, of which the following is a full, clear, and exact description.

My invention relates to lubricating attachments and particularly to a type of devices of this class, which may be installed in an air line leading to the parts needing lubrication. The lubricant, in devices of this character, is inserted into a chamber through which the air passes and is carried from this chamber by the air current. The invention is, also, applicable to any lubricating cup or chamber which is provided with an opening through which the lubricant is introduced into the cup or chamber. In devices heretofore used it has been the custom to provide a threaded cap or nut which must be removed with the fingers or a wrench, in order to expose the oil opening and after the chamber has been filled this cap or nut must be replaced.

One object of my invention is to provide a lubricating attachment into which the lubricant may be introduced expeditiously and without the removal and replacing of any parts.

Another object of my invention is to provide a device of the character described, the opening in which will automatically close after the introduction of the oil.

Still another object of my invention is to provide a lubricating attachment for introduction into an air line which will prevent the loss or the "blowing out" of the lubricant when the machinery is in operation.

To these and other ends, the invention resides in the novel features and combinations of parts to be hereinafter described and claimed.

Figure 1:
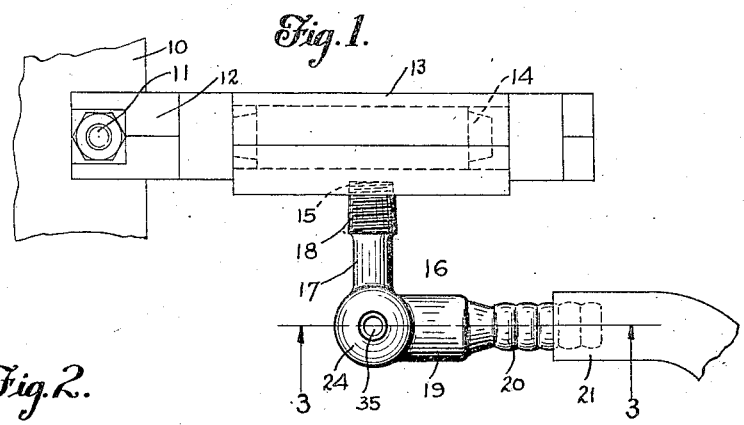
Fig. 1 is a plan view of a device embodying my invention applied to a vibrator.
Figure 2:
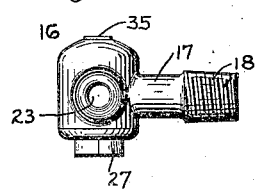
Fig. 2 is a side view in elevation looking toward the left in Fig. 1.
Figure 3:
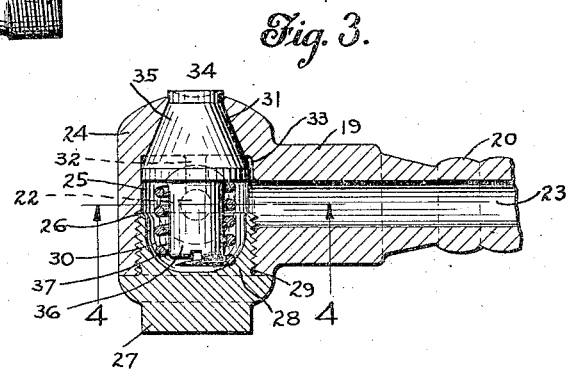
Fig. 3 is a sectional view on line 3—3 of Fig. 1.

I have chosen to illustrate a preferred form of my invention as applied to an oiler elbow for a vibrator of the type shown in Patent No. 1,336,931 granted Apr. 13, 1920, to George B. Pickop, but it will be apparent that the invention is capable of broad application, and is not limited to the exact form shown. To this end I have shown diagrammatically in Fig. 1, a pattern board 10, to which is attached at 11, one end 12 of a vibrator cylinder 13. Within this cylinder is shown in dotted lines a piston 14, the cylinder being provided with a threaded inlet opening 15 for the introduction of air. The parts just described are of usual form and are shown in the patent above referred to.

Figure 4:
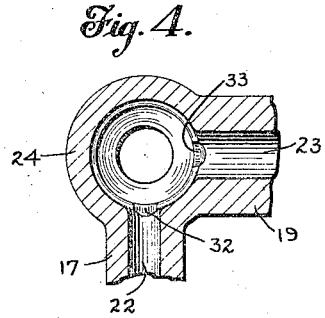
Fig. 4 is a sectional view on line 4—4 of Fig. 3.

An elbow denoted as a whole by the numeral 16, is shown as provided with an arm 17 having a threaded end 18 for cooperation with the threaded opening 15, and a second arm 19, at right angles to the first, having provision at 20 for connection with a hose or other flexible tubing 21, which is connected to a source of compressed air (not shown). As shown in Fig. 4, the arms 17 and 19 are provided with air passages 22 and 23 respectively.

At the junction of the two arms 17 and 19, an enlarged elbow 24 is provided, containing a cylindrical chamber 25, the lower end of which is threaded internally at 26 for the reception of a closure cap 27, provided with a neck portion 28, threaded externally at 29, and having a recess 30 in its upper surface. A tapered opening 31, communicates with the chamber 25 through the top thereof, as do the air passages 22 and 23 at the chamber sides. The wall of the chamber 25 is provided with two oil grooves 32 and 33 extending from the top of the chamber down to and communicating with the air passages 22 and 23 for a purpose to be hereinafter explained.

A valve 34 is movably mounted in the chamber 25 and consists of a tapered valve head 35, which serves to effectually close the tapered opening 31, and a stem 36. The valve is yieldably held in closed or upward position by a spring, shown in the embodiment illustrated, as a coil spring 37, which surrounds the valve stem 36.

In operation, the valve head is pushed down against the tension of the spring, 37, by the spout of an oil can in the hands of the operator, and the oil may then be discharged from the can into the chamber 25.

Immediately that the spout of the oil can is withdrawn, the spring 37 moves the valve upward to closed position. If the air is then turned on in the passage 23, the oil will be carried through the passage 22 to lubricate the working parts of the vibrator and will be prevented from flowing out of the oil inlet 31. If the return of the valve head to closed position tends to catch and hold any of the oil in the upper part of the cylindrical chamber 25, the oil so held will run down into the working part of the chamber through the oil grooves 32 and 33.

It will be understood that the invention is not to be limited to the exact details of construction shown in the drawings but is capable of wide application and of many modifications without departing from the spirit thereof, or from the scope of the appended claims.

What I claim is:

1. In a lubricating attachment, a lubricant chamber having an inlet opening at the upper side of the same, a valve to close said opening, a spring below said valve, to urge the same to closed position, and a removable plug in a wall of said chamber opposite the inlet opening to support said spring, said plug having a recess to receive the lower end of said spring.

2. In a lubricating attachment, a lubricant chamber having an inlet opening at the top thereof, a valve to close said opening, a spring below said valve to urge the same to closed position, said spring resting against the bottom of said chamber.

3. In a lubricating attachment, a fluid passage provided with an inlet opening communicating with the atmosphere for the introduction of a lubricant into said fluid passage, and a valve yieldably urged to close said opening.

4. In a lubricating attachment, a fluid passage provided with an inlet opening for the introduction of a lubricant into said fluid passage, and a valve bodily movable in said passage and yieldably urged to close said opening.

5. In a lubricating attachment, a fluid passage provided with an inlet opening for the introduction of a lubricant into said fluid passage, and a valve unattached to the walls of said passage, and yieldably urged to close said opening.

6. In a lubricating attachment, a fluid supply pipe having an inlet opening for the introduction of a lubricant into said pipe, a valve within said pipe and supported from the bottom thereof and yieldably urged to close said opening.

7. In a lubricating attachment, a fluid passage having a tapered opening for the introduction of a lubricant therein, and a correspondingly tapered valve within said passage normally urged to close said opening.

8. In a lubricating attachment, a fluid passage having an inlet opening at the upper side thereof for the introduction of a lubricant, a valve to close said opening, and a removable plug to support said valve.

9. In a lubricating attachment, a fluid passage having an inlet opening for the introduction of a lubricant, and a valve to close said opening, a spring below said valve to urge the same to closed position, and a removable plug to support said spring said plug being mounted in a wall of said passage opposite the valve.

10. In a lubricating attachment, a fluid passage having an inlet opening for the introduction of a lubricant, and a valve to close said opening, a spring below said valve to urge the same to closed position, and a removable plug to support said spring, said plug having a recess to receive said spring.

11. In a lubricating attachment, a fluid passage having an inlet opening for the introduction of a lubricant, and a valve to close said opening, a spring to urge said valve to closed position, resting against a wall of said passage opposite the valve.

12. In a lubricating attachment, a fluid passage elbow having an inlet opening at the upper portion thereof for the introduction of a lubricant, and a valve to close said opening supported at the lower side of the elbow.

13. In a lubricating attachment, a fluid passage having an inlet opening for the introduction of a lubricant therein, a valve comprising a head and a stem for closing said opening, and a spring surrounding said stem to urge said valve to closed position, said spring resting upon a wall of said passage opposite the opening.

14. In a lubricating attachment, a fluid passage, an enlarged elbow in said passage having an opening for the introduction of a lubricant, and a valve yieldably urged to close said opening.

15. In a lubricating attachment, a lubricant chamber having an inlet opening, a valve for closing said opening, the walls of said chamber being provided with oil grooves, adjacent said valve.

16. A fluid supply pipe, having a pair of oppositely disposed openings in the walls thereof, a valve associated with one of said openings and having a spring to urge the same to closed position, and a plug, inserted in the other of said openings, engaging said spring to support the same.

17. An oiler elbow for a fluid supply pipe having a chamber at the bend of said elbow, said chamber having connections whereby the fluid passes through the same, said chamber being provided with a valved inlet opening for a lubricant.

18. An oiler elbow for a fluid supply pipe having a chamber at the bend of said elbow, said chamber having connections whereby the fluid passes through the same, said chamber having a valved inlet opening for a lubricant, a spring to urge said valve to closed position, said spring being supported upon a wall of chamber opposite said opening.

19. An oiler elbow for a fluid supply pipe having a chamber provided with inlet and outlet fluid passages at its intermediate portion, and with a valved inlet opening at one end thereof, the wall of said chamber being grooved adjacent the open end, said grooves communicating with said fluid passages, to supply a lubricant therein.

20. An elbow for a fluid supply pipe provided with inlet and outlet passages arranged at an angle to each other, and having, at the bend thereof, a valved opening for the introduction of a lubricant.

In witness whereof, I have hereunto set my hand on this 17th day of July, 1920.

DANIEL BRANDRIFF.